July 11, 1944.  J. L. HAJEK, JR  2,353,559
BUCKING TOOL
Filed April 3, 1942
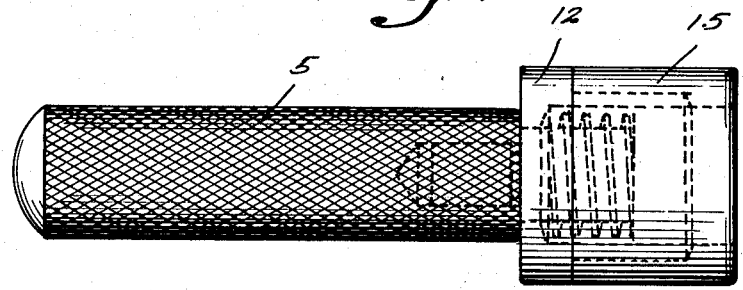
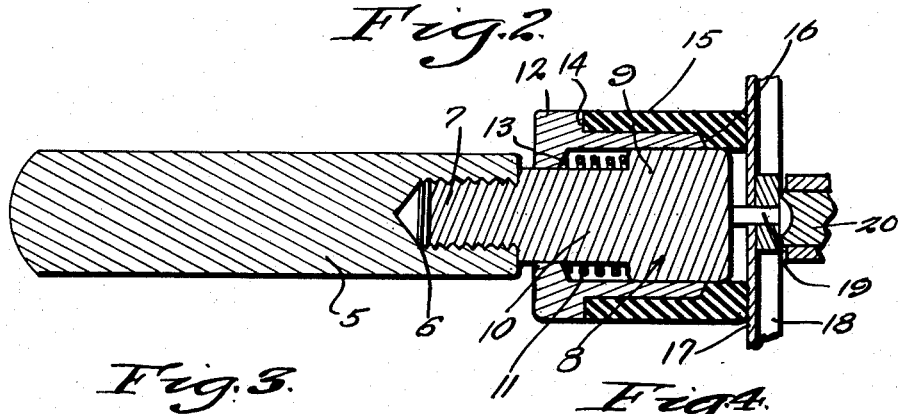
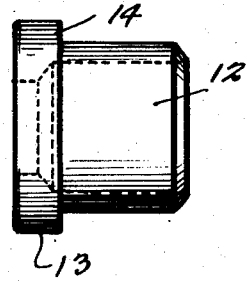
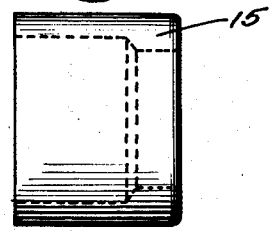
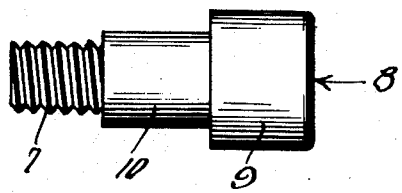
Inventor
James L. Hajek, Jr.
By Clarence A. O'Brien
and Harvey B. Jacobson
Attorneys

UNITED STATES PATENT OFFICE 2,353,559

BUCKING TOOL

James L. Hajek, Jr., Cleveland, Ohio

Application April 3, 1942, Serial No. 437,563

2 Claims. (Cl. 78—53.5)

The present invention relates to bucking tools for riveting relatively thin material on a supporting frame, and has for its primary object to provide means to prevent bulging or distortion of the material in the region of the rivet while the rivet is being set.

The invention is designed primarily for use in the airplane industry where a relatively thin metal skin is riveted in position on the frame or bulkhead of the body of the airplane, and the invention has for its primary object to provide a rivet bucking tool of this character which is efficient and reliable in performance, relatively inexpensive to manufacture, and otherwise well adapted for the purposes for which the same is intended.

Other objects and advantages reside in the details of construction and operation, as more fully hereinafter described and claimed, reference being had to the accompanying drawing forming part hereof, wherein like numerals refer to like parts throughout, and in which:

Figure 1 is a side elevational view.

Figure 2 is a longitudinal sectional view.

Figure 3 is a side elevational view of the collar slidably mounted on the anvil or head of the tool.

Figure 4 is a similar view of the rubber sleeve forming an extension for the collar, and Figure 5 is a side elevational view of the anvil.

Referring now to the drawing in detail, wherein for illustration I have disclosed a preferred embodiment of the invention, the numeral 5 designates the substantially cylindrical handle having a threaded recess 6 in one end to which is threadedly secured the stem portion 7 of the anvil 8 of the bucking tool. The anvil 8 includes the head portion 9 and reduced shank 10 to which the threaded stem 7 is connected and mounted on the shank 10 is a coil spring 11 which abuts the head 9. The head 9 is of cylindrical form and slidably mounted thereon is a collar 12 having a flange 13 at its inner end engaging the spring 11. The flange 13 also extends radially outwardly from the collar to form a shoulder 14 against which the inner end of a sleeve 15 abuts, the sleeve being constructed of hard rubber and is snugly fitted on the collar.

The outer end of the sleeve is formed with an inwardly projecting flange 16 to provide a bore corresponding to the bore of the collar and thus form an extension for the collar in which the anvil as adapted to slide.

The outer end of the sleeve 15 projects beyond the end of the anvil 8 and is adapted to bear against the outer surface of the skin covering 17 which is secured in position on the bulkhead or frame 18 of the fuselage of an airplane and is secured in position thereto by means of a rivet 19. The rivet set of conventional construction for engaging the head of the rivet is designated generally at 20.

In the operation of the tool, the handle portion 5 is grasped by the hand of the operator and the thumb and forefinger engage the collar 12 for forcing the outer end of the sleeve 15 against the surface of the skin surrounding the rivet and by applying pressure on the collar the skin will be firmly held against distortion or buckling movement during the setting of the rivet.

It is believed the details of construction, operation and manner of use of the tool will be readily understood from the foregoing without further detailed explanation.

Having thus described the invention, what I claim is:

1. A rivet bucking tool comprising a handle, a head secured on the handle, a collar slidably mounted on the head with its inner end restrained between the head and the handle, a hard rubber sleeve mounted on the collar and having a relatively wide outer end adapted to project outwardly beyond the head and the collar for engaging the surface of the work in the region of the rivet, said outer end of the sleeve having an internal shoulder forming an abutment for the end of the collar and spring means for retracting the collar.

2. A rivet bucking tool comprising a handle, a head secured on the handle, a collar slidably mounted on the head with its inner end restrained between the head and the handle, and a hard rubber sleeve mounted on the collar and having a relatively wide outer end adapted to project outwardly beyond the head and the collar for engaging the surface of the work in the region of the rivet, said outer end of the sleeve having an internal shoulder forming an abutment for the end of the collar.

JAMES L. HAJEK, JR.